(12) United States Patent
Slegel et al.

(10) Patent No.: US 10,831,480 B2
(45) Date of Patent: Nov. 10, 2020

(54) MOVE DATA AND SET STORAGE KEY INSTRUCTION

(71) Applicant: INTERNATIONAL BUSINESS MACHINES CORPORATION, Armonk, NY (US)

(72) Inventors: Timothy Slegel, Staatsburg, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/283,966

(22) Filed: Feb. 25, 2019

(65) Prior Publication Data
US 2020/0272465 A1 Aug. 27, 2020

(51) Int. Cl.
*G06F 9/30* (2018.01)
*G06F 3/06* (2006.01)

(52) U.S. Cl.
CPC ........ *G06F 9/30032* (2013.01); *G06F 3/0622* (2013.01); *G06F 3/0637* (2013.01); *G06F 3/0673* (2013.01); *G06F 9/3004* (2013.01)

(58) Field of Classification Search
CPC ................................................. G06F 9/30032
See application file for complete search history.

(56) References Cited

U.S. PATENT DOCUMENTS

| | | | |
|---|---|---|---|
| 5,812,147 A | 9/1998 | Van Hook et al. | |
| 7,051,190 B2 * | 5/2006 | Samra | G06F 9/3853 712/210 |
| 8,677,077 B2 | 3/2014 | Farrell et al. | |
| 8,930,673 B2 | 1/2015 | Greiner et al. | |
| 9,934,159 B2 | 4/2018 | Greiner et al. | |
| 2002/0040429 A1 | 4/2002 | Dowling | |
| 2007/0271432 A1 | 11/2007 | Greiner | |
| 2010/0115248 A1* | 5/2010 | Ouziel | G06F 9/3853 712/226 |

(Continued)

FOREIGN PATENT DOCUMENTS

| | | |
|---|---|---|
| CN | 101853220 A | 10/2010 |
| EP | 1857926 A1 | 11/2007 |

OTHER PUBLICATIONS

Z/Architecture, Principles of Operation, Tenth Edition, Sep. 2012 (Year: 2012).*

(Continued)

*Primary Examiner* — Farley Abad
(74) *Attorney, Agent, or Firm* — Steven Chiu, Esq.; Blanche E. Schiller, Esq.; Heslin Rothenberg Farley & Mesiti P.C.

(57) ABSTRACT

A single architected instruction is obtained to perform multiple functions. The instruction is executed, and the executing includes performing a first function of the multiple functions and a second function of the multiple functions. The first function includes moving a block of data from one location to another location, and the second function includes setting a storage key. The storage key is associated with the block of data at the other location and controls access to the block of data. The first function and the second function are performed as part of the single architected instruction.

20 Claims, 9 Drawing Sheets

(56) References Cited

U.S. PATENT DOCUMENTS

2011/0145550 A1    6/2011    Greiner
2017/0300258 A1   10/2017   Farrell et al.

OTHER PUBLICATIONS

IBM, "Address Translation Using Variable-Sized Page Tables," IP.com No. IPCOM000018736D, Aug. 2003, pp. 1-6 (+ cover).

IBM, "IBM System/360 Time Sharing System," Form GY28-2009-2, Jun. 1970, pp. i-xi; 1-311; Technical Newsletter GN28-3146; Technical Newsletter GN28-3193 and Technical Newsletter GN28-3219.

IBM, "Memory Access Audi Tool," IP.com No. IPCOM000245764D, Apr. 2016, pp. 1-6 (+ cover).

IBM, "Removing Non-Visible User Interface Elements," IP.com No. IPCOM000226025D, Mar. 2013, pp. 1-9, Figs. 1-9 (+ cover).

IBM, "z/Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

Slegel, Timothy et al., "Move Data And Set Storage Key Function Control," U.S. Appl. No. 16/283,976, filed Feb. 25, 2019, pp. 1-46.

List of IBM Patents or Patent Applications Treated as Related, Mar. 6, 2019, pp. 1-2.

* cited by examiner

```
┌─────────────────────────────────────────────────────────────────────┐
│  ┌───────────────────────────────────────────────────────────────┐  │
│  │ OBTAIN AN INSTRUCTION TO PERFORM MULTIPLE FUNCTIONS~500       │  │
│  │                                                               │  │
│  │    THE INSTRUCTION BEING A SINGLE ARCHITECTED INSTRUCTION~502 │  │
│  │                                                               │  │
│  │ EXECUTE THE INSTRUCTION, THE EXECUTING INCLUDING~504          │  │
│  │                                                               │  │
│  │    PERFORMING A FIRST FUNCTION OF THE MULTIPLE FUNCTIONS, THE │  │
│  │    FIRST FUNCTION INCLUDING MOVING A BLOCK OF DATA FROM ONE   │  │
│  │    LOCATION TO ANOTHER LOCATION~506                           │  │
│  │                                                               │  │
│  │    PERFORMING A SECOND FUNCTION OF THE MULTIPLE FUNCTIONS, THE│  │
│  │    SECOND FUNCTION INCLUDING SETTING A STORAGE KEY~508        │  │
│  │                                                               │  │
│  │       THE STORAGE KEY IS ASSOCIATED WITH THE BLOCK OF DATA AT │  │
│  │       THE OTHER LOCATION AND CONTROLS ACCESS TO THE BLOCK OF  │  │
│  │       DATA~510                                                │  │
│  │                                                               │  │
│  │       THE FIRST FUNCTION AND THE SECOND FUNCTION ARE  ~512    │  │
│  │       PERFORMED AS PART OF THE SINGLE ARCHITECTED INSTRUCTION │  │
│  └───────────────────────────────────────────────────────────────┘  │
│                                                                     │
│  ┌───────────────────────────────────────────────────────────────┐  │
│  │ THE PERFORMING THE FIRST FUNCTION AND THE PERFORMING THE SECOND│ │
│  │ FUNCTION ARE PERFORMED CONCURRENTLY ~514                      │  │
│  └───────────────────────────────────────────────────────────────┘  │
│                                                                     │
│  ┌───────────────────────────────────────────────────────────────┐  │
│  │ THE EXECUTING THE INSTRUCTION INCLUDES OBTAINING A KEY FUNCTION│ │
│  │ CONTROL FROM A LOCATION ASSOCIATED WITH THE INSTRUCTION, THE KEY 516│
│  │ FUNCTION CONTROL SPECIFYING THE SECOND FUNCTION TO BE PERFORMED│ │
│  │                                                               │  │
│  │ THE SETTING THE STORAGE KEY INCLUDES USING THE KEY FUNCTION CONTROL│
│  │ TO DETERMINE HOW TO SET THE STORAGE KEY~518                   │  │
│  │                                                               │  │
│  │ THE SETTING THE STORAGE KEY, BASED ON THE KEY FUNCTION CONTROL│  │
│  │ INCLUDES SETTING THE STORAGE KEY USING VALUES OF CORRESPONDING│  │
│  │ FIELDS OF A STORAGE KEY INCLUDED IN THE LOCATION ASSOCIATED WITH THE│
│  │ INSTRUCTION ~519                                              │  │
│  │                                                               │  │
│  │ LOCATION ASSOCIATED WITH THE INSTRUCTION INCLUDES AN IMPLIED  │  │
│  │ REGISTER USED BY THE INSTRUCTION~520                          │  │
│  └───────────────────────────────────────────────────────────────┘  │
└─────────────────────────────────────────────────────────────────────┘

FIG. 5A
```

THE STORAGE KEY INCLUDES ONE OR MORE FIELDS USED TO CONTROL ACCESS TO THE BLOCK OF DATA ~ 522

THE ONE OR MORE FIELDS INCLUDE AN ACCESS CONTROL FIELD TO BE USED TO DETERMINE WHETHER ACCESS OF THE BLOCK OF DATA IS TO BE PERFORMED, A FETCH PROTECTION FIELD TO BE USED TO DETERMINE WHETHER KEY CONTROLLED PROTECTION APPLIES TO FETCH-TYPE REFERENCES, A REFERENCE FIELD TO BE USED TO DETERMINE WHETHER THE BLOCK OF DATA HAS BEEN REFERENCED, AND A CHANGE FIELD TO BE USED TO DETERMINE WHETHER THE BLOCK OF DATA HAS BEEN STORED INTO ~ 524

THE MOVING THE BLOCK OF DATA INCLUDES REPLACING DATA IN THE OTHER LOCATION WITH THE BLOCK OF DATA OF THE ONE LOCATION, THE OTHER LOCATION AND THE ONE LOCATION BEING SPECIFIED BY THE INSTRUCTION ~ 526

THE OTHER LOCATION IS SPECIFIED BY ONE REGISTER INDICATED BY ONE REGISTER FIELD OF THE INSTRUCTION AND THE ONE LOCATION IS SPECIFIED BY ANOTHER REGISTER INDICATED BY ANOTHER REGISTER FIELD OF THE INSTRUCTION ~ 528

THE BLOCK OF DATA INCLUDES A PAGE OF DATA ~ 530

FIG. 5B

MOVE DATA AND SET STORAGE KEY INSTRUCTION

BACKGROUND

One or more aspects relate, in general, to facilitating processing within a computing environment, and in particular, to facilitating processing associated with moving data.

In computer processing, data is often moved from one location in memory (e.g., a source page) to another location in memory (e.g., a destination page). In one or more architectures, this is performed using an architected instruction. For instance, in the z/Architecture® hardware architecture offered by International Business Machines Corporation, Armonk, N.Y., a Move Page instruction is used to move data from the one location to the other location.

Further, in the z/Architecture hardware architecture, a storage key is associated with the data being moved and is used to control access to the data. In particular, a storage key is associated with each block of memory (e.g., each page of memory) in a configuration and is used to control access to its corresponding block of memory. To set the storage key on, for instance, the destination page, a Set Storage Key Extended instruction is used. The Move Page and Set Storage Key Extended instructions are separate instructions, each being privileged instructions, independently dispatched by an operating system, such as the z/OS® operating system offered by International Business Machines Corporation, Armonk, N.Y.

SUMMARY

Shortcomings of the prior art are overcome, and additional advantages are provided through the provision of a computer program product for facilitating processing within a computing environment. The computer program product includes a computer readable storage medium readable by a processing circuit and storing instructions for performing a method. The method includes obtaining an instruction to perform multiple functions, the instruction being a single architected instruction. The instruction is executed, and the executing includes performing a first function of the multiple functions, the first function including moving a block of data from one location to another location. The executing also includes performing a second function of the multiple functions, the second function including setting a storage key, the storage key being associated with the block of data at the other location and controlling access to the block of data. The first function and the second function are performed as part of the single architected instruction.

By using a single architected instruction to perform the multiple functions, a separate architected instruction is not needed for the set storage key function. Thus, the functions may be performed much faster, reducing execution time, and improving processor and/or overall system performance.

In one example, the performing the first function and the performing the second function are performed concurrently. By performing the functions concurrently, performance is improved. In other embodiments, the first function and the second function are performed by the single instruction but are not necessarily performed concurrently.

In one example, the executing the instruction includes obtaining a key function control from a location associated with the instruction, the key function control specifying the second function to be performed. The setting the storage key includes, for instance, using the key function control to determine how to set the storage key. In one example, the setting of the storage key, based on the key function control, includes setting the storage key using values of corresponding fields of a storage key included in the location associated with the instruction. Further, in one example, the location associated with the instruction includes an implied register used by the instruction.

The use of a key function control enables one instruction to perform multiple set storage key functions, enabling the storage key to be set in different ways depending on the key function control of a single architected instruction.

As an example, the storage key includes one or more fields used to control access to the block of data. The one or more fields include, for instance, an access control field to be used to determine whether access of the block of data is to be performed, a fetch protection field to be used to determine whether key controlled protection applies to fetch-type references, a reference field to be used to determine whether the block of data has been referenced, and a change field to be used to determine whether the block of data has been stored into.

The moving the block of data includes, in one example, replacing data in the other location with the block of data of the one location, the other location and the one location being specified by the instruction. As an example, the other location is specified by one register indicated by one register field of the instruction and the one location is specified by another register indicated by another register field of the instruction.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 5A-5B depict one example of facilitating processing within a computing environment, in accordance with an aspect of the present invention;

DETAILED DESCRIPTION

In accordance with an aspect of the present invention, a capability is provided to facilitate processing within a computing environment. As one example, a single instruction (e.g., a single architected machine instruction at the hardware/software interface) is provided to perform, as part of a single instruction, multiple functions or operations, such as moving data and setting a storage key associated with the data. The instruction is part of a general-purpose processor instruction set architecture (ISA), which is dispatched by a program (e.g., an operating system) on a processor, such as a general-purpose processor.

In one example, the instruction, referred to as a Move Page instruction, is used to move a block of data (e.g., a page of data) from a source location (e.g., a source page) to a destination location (e.g., a destination page) and to set a storage key on the destination location. As an example, the block of data is a page of data, which is, for instance, 4K-bytes of data. In other examples, the block of data may be other than a page of data and/or the page of data may be other than 4K-bytes of data.

In one example, the multiple functions are performed concurrently to improve performance; however, in other examples, the multiple functions are performed by the single instruction, but not necessarily concurrently. Many variations are possible.

Figure 1A:
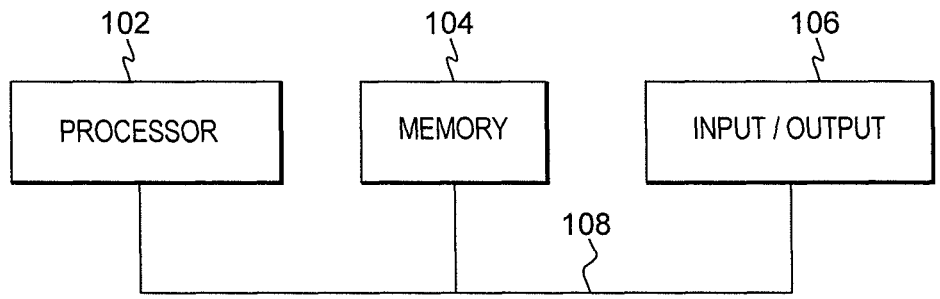
FIG. 1A depicts one example of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture hardware architecture, and is part of a server, such as an IBM Z® server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, 12$^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system.

Figure 1B:
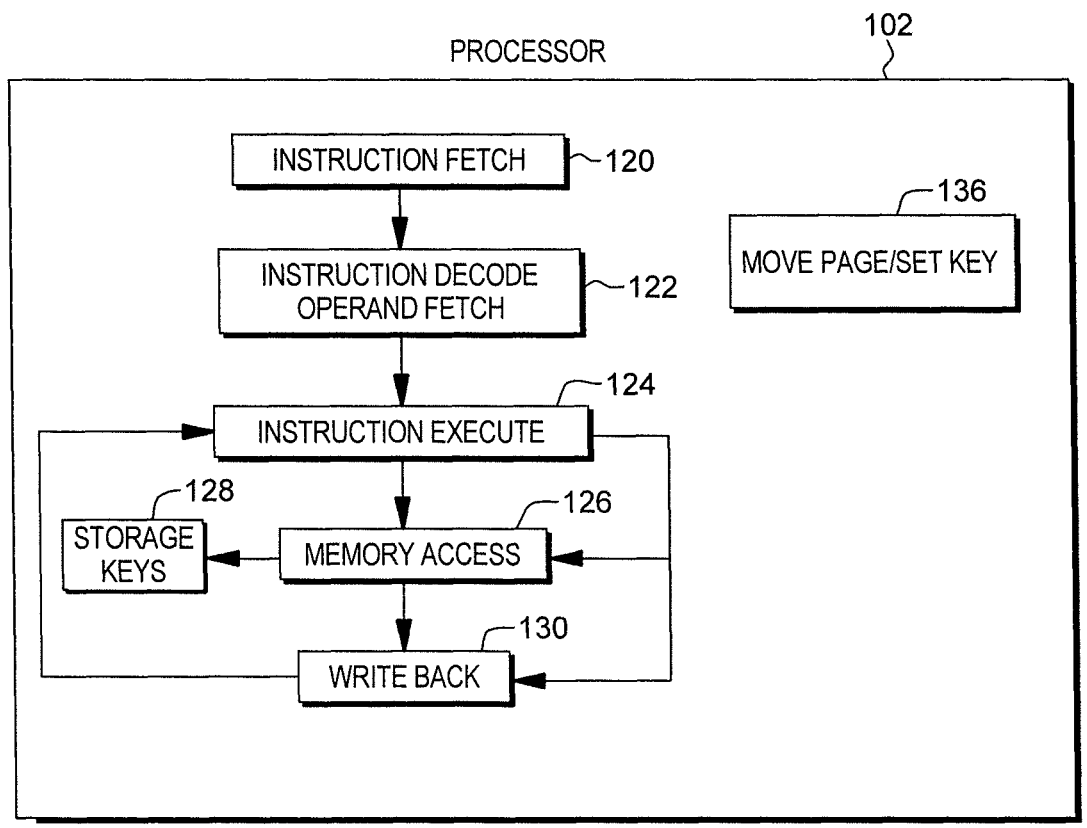
FIG. 1B depicts further details of a processor of FIG. 1A, in accordance with one or more aspects of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components used in moving data and setting a storage key associated therewith (or other processing that may use one or more aspects of the present invention), as described herein. The one or more other components include, for instance, a move data/set storage key component (or other component) 136.

In one example, memory access component 126 uses one or more storage keys 128 to determine whether an instruction requesting access to one or more blocks of memory is authorized for the type of access being requested.

Another example of a computing environment to incorporate and use one or more aspects of the present invention is described with reference to FIG. 2. In one example, the computing environment is based on the z/Architecture hardware architecture; however, the computing environment may be based on other architectures offered by International Business Machines Corporation or others.

Figure 2:
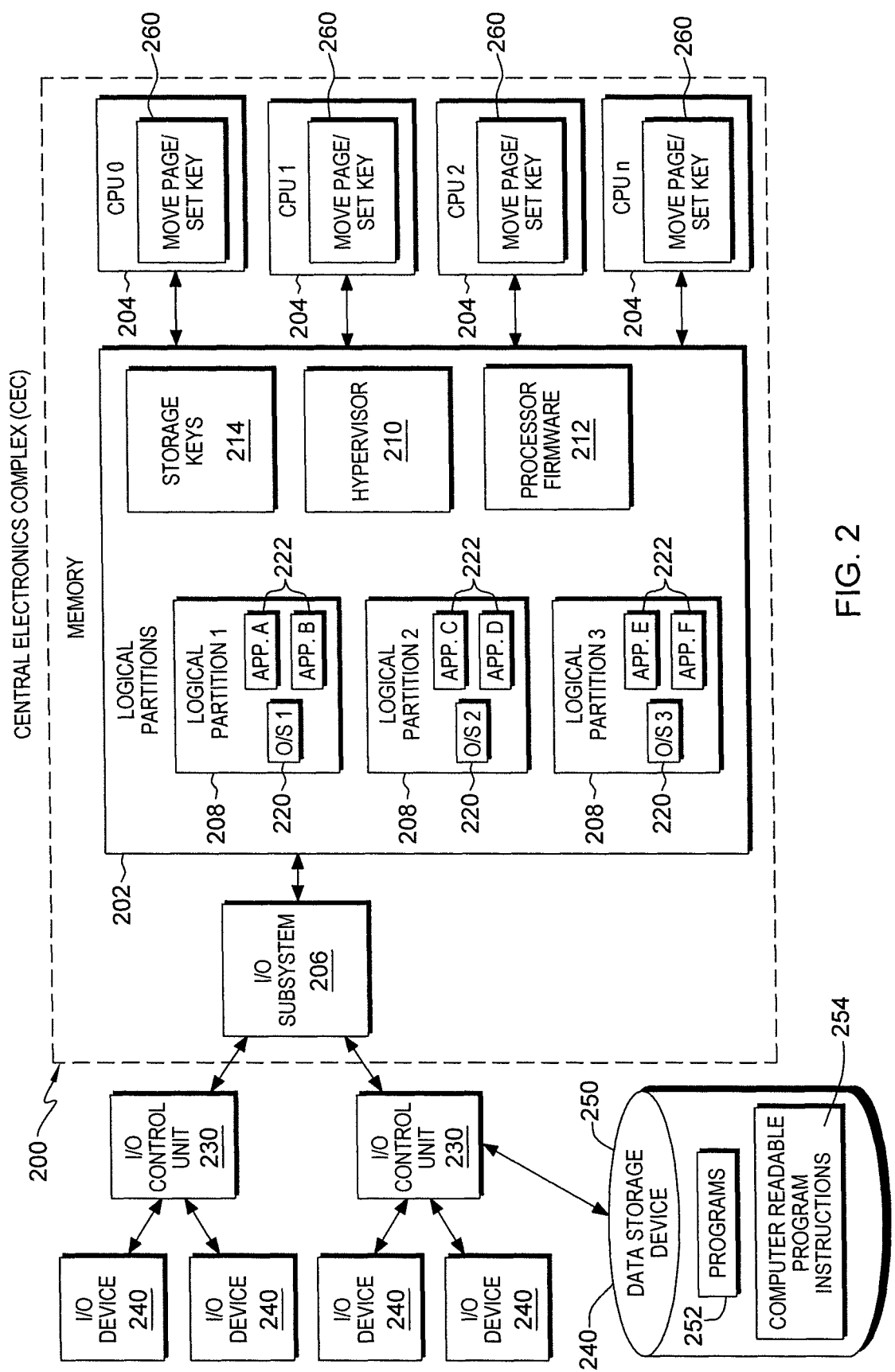
FIG. 2 depicts another example of a computing environment to incorporate and use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, processor firmware 212 and storage keys 214 (described herein). One example of hypervisor 210 is the Processor Resource/System Manager (PR/SM™) hypervisor, offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as a z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

As one example, each processor 204 includes and/or has access to a move data/set storage key component (or other component) 260 used in performing multiple functions including moving data and setting a storage key (and/or other operations of one or more aspects of the present invention). In various examples, there may be one or more components performing these functions. Many variations are possible.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general-purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

In accordance with an aspect of the present invention, a computing environment, such as computing environment 100 or central electronics complex 200, employs a move page and set key facility that provides a mechanism to move a block of data and to set a storage key, as part of dispatching a single instruction. In one example, the move page and set key facility is installed in the system when a facility indicator is set, e.g., to one. As one particular example of the z/Architecture hardware architecture, facility bit 149 is set to, e.g., one, when the facility is installed in the z/Architecture architectural mode. The facility includes, for instance, the Move Page instruction, an embodiment of which is described below.

One embodiment of a Move Page instruction to perform multiple functions including moving a block of data (e.g., a page of data) and setting a storage key is described with reference to FIGS. 3A-3D. The instruction is executed, in one example, using a general-purpose processor (e.g., processor 102 or 204). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, is specified, this is only an example. The bit may be set to a different value, such as the opposite value or to another value, in other examples. Many variations are possible.

Figure 3A:
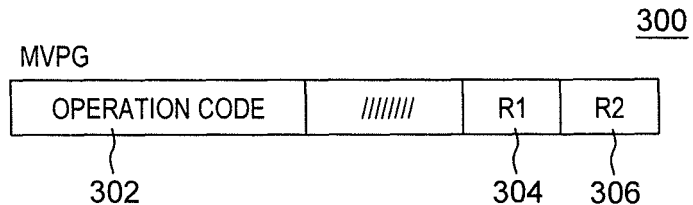
FIG. 3A depicts one format of a Move Page instruction used to move data and set a storage key, in accordance with an aspect of the present invention.

Referring to FIG. 3A, in one example, a format of a Move Page instruction 300 is an RRE format that denotes a register and register operation with an extended operation code (opcode) field. As an example, the instruction includes an operation code field 302 (e.g., bits 0-15) having an operation code indicating a move page operation; a first register field ($R_1$) 304 (e.g., bits 24-27) designating a general register, $R_1$, the contents of which include, for instance, the leftmost byte of a first operand in storage; and a second register field ($R_2$) 306 (e.g., bits 28-31) designating a general register, $R_2$, the contents of which include, for instance, the leftmost byte of a second operand in storage. In one example, bits 16-23 of the instruction are reserved and should contain zeros; otherwise, the program may not operate compatibly in the future. As used herein, the program is the one issuing the instruction. It is, for instance, a privileged program, such as an operating system.

Figure 3B:
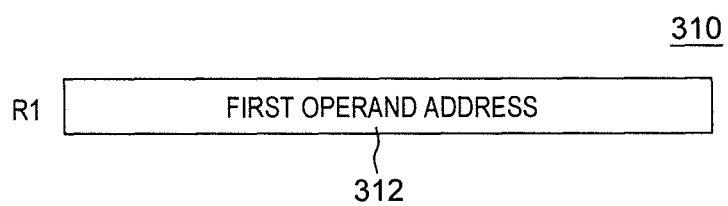
FIG. 3B depicts one example of contents of a register, $R_1$, specified by the Move Page instruction, in accordance with an aspect of the present invention.
Figure 3C:
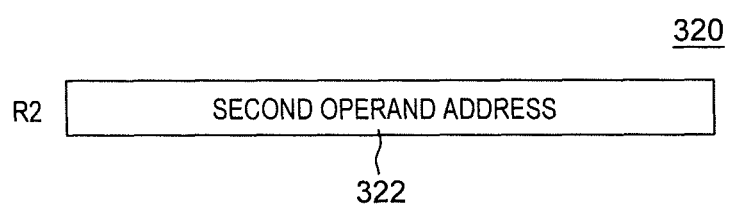
FIG. 3C depicts one example of contents of another register, $R_2$, specified by the Move Page instruction, in accordance with an aspect of the present invention.

Further details regarding general register $R_1$ and general register $R_2$ are described with reference to FIGS. 3B-3C. For instance, as shown in FIG. 3B, general register $R_1$ 310 includes a location of the leftmost byte of the first operand; i.e., a first operand address 312. Further, with reference to FIG. 3C, general register $R_2$ 320 includes a location of the leftmost byte of the second operand; i.e., a second operand address 322.

The handling of the addresses in general registers $R_1$ and $R_2$ depends on the addressing mode. For instance, in the 24-bit addressing mode, the contents of bit positions 40-51 of a general register, with 12 rightmost zeros appended, are the address, and bits 0-39 and 52-63 in the register are ignored. In the 31-bit addressing mode, the contents of bit positions 33-51 of a general register, with 12 rightmost zeros appended, are the address, and bits 0-32 and 52-63 in the register are ignored. In the 64-bit addressing mode, the contents of bit positions 0-51 of a general register, with 12 rightmost zeros appended, are the address, and bits 52-63 in the register are ignored.

In addition to general registers $R_1$ and $R_2$, execution of the instruction includes the use of one or more implied general registers (i.e., registers not explicitly designated by the instruction). For instance, general register 0 is used in execution of the instruction, and in one example, contains various controls affecting the operation of the instruction.

Figure 3D:
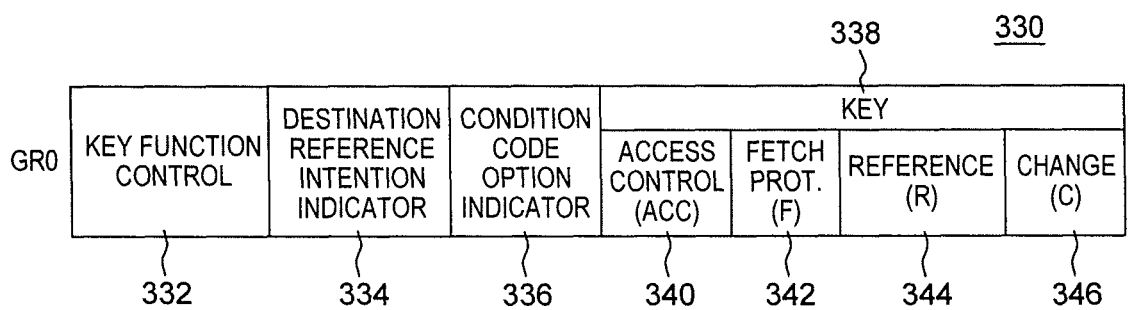
FIG. 3D depicts one example of fields of an implied register, general register 0, used by the instruction, in accordance with an aspect of the present invention.

As an example, with reference to FIG. 3D, general register 0 (330) includes a plurality of fields, such as for instance:

Key Function Control 332: In one example, in accordance with an aspect of the present invention, bits 51-53 of general register 0 contain the key function control (KFC) which is used to determine how the supplied storage key in bits 56-62 will be used or set. Example control codes are indicated below:

KFC Meaning

0 The PSW (program status word) key is used for accessing both operands. The reference (R) and change (C) bits are set in the storage key on the operand 1 block.

1 The PSW key is used for store accesses to the first operand and the supplied ACC key (e.g., bits 56-59 of general register 0) is used for fetch accesses to the second operand. The reference (R) and change (C) bits are set in the storage key on the operand 1 block.
2 The supplied ACC key (e.g., bits 56-59 of general register 0) is used for store accesses to the first operand and the PSW key is used for fetch accesses to the second operand. The reference (R) and change (C) bits are set in the storage key on the operand 1 block.
3 Reserved
4 Key controlled protection does not apply to the first operand. The PSW key is used for fetch accesses to the second operand. The storage key of the 4K-byte block of the first operand is set to the full key supplied in bits 56-62 of general register 0.
5 Key controlled protection does not apply to the first operand. The PSW key is used for fetch accesses to the second operand. The storage key of the 4K-byte block of the first operand is set as follows: the access control bits (ACC) and fetch protection bit (F) are copied from the storage key of the second operand, and the reference bit (R) and change bit (C) use the value supplied in bits 61-62 of general register 0.
6-7 Reserved In one example, when the move page and set key facility is not installed, KFC values of 4 and 5 are also reserved. If a reserved value is specified, a specification exception is recognized.

Destination Reference Intention Indicator 334: In one example, bit 54 of general register 0 is a destination reference intention bit.

Condition Code Option Indicator 336: In one example, bit 55 is a condition code option bit.

Storage Key 338: In one example, bits 56-62 of general register 0 include the storage key. A storage key is associated, for instance, with each block of storage (e.g., each 4K-byte block) that is available in the configuration. The storage key includes the following fields:

Access Control (ACC) 340: Bits 56-59 of the storage key in general register 0 are the access control bits. If a reference is subject to key-controlled protection, the four access control bits, bits 0-3, are matched with a four-bit access key when information is stored and when information is fetched from a location that is protected against fetching.

Fetch Protection (F) 342: Bit 60 of the storage key in general register 0 is the fetch protection bit. If a reference is subject to key-controlled protection, the fetch protection bit controls whether key-controlled protection applies to fetch-type references: a zero indicates that only store-type references are monitored and that fetching with any access key is permitted; a one indicates that key-controlled protection applies to both fetching and storing. No distinction is made between the fetching of instructions and of operands.

Reference (R) 344: Bit 61 of the storage key in general register 0 is the reference bit. The reference bit normally is set to, e.g., one each time a location in the corresponding storage block is referred to either for storing or for fetching of information.

Change (C) 346: Bit 62 of the storage key in general register 0 is the change bit. The change bit is set to one each time information is stored at a location in the corresponding storage block.

In one example, the storage key is not part of addressable storage.

Bits 48-50 of general register 0 are to be zeros, in one example; otherwise, a specification exception is recognized. Bits 0-47 and 63 of general register 0 are ignored. When the move page and set key facility is not installed, bits 60-62 are also ignored. In one example, bits 60, 61 and 62 are not meaningful, unless KFC values of 4 or 5 are used.

In one example, in execution of the Move Page instruction, the first operand is replaced by the second operand and, optionally, the storage key is set on the 4K-byte block of the first operand. The first and second operands both are, for instance, 4K bytes on 4K-byte boundaries. The results are indicated in the condition code. The accesses to the first operand location or the second operand location, but not to both locations, may be performed by using the key specified in general register 0 (e.g., storage key 338); otherwise, the accesses to an operand location are performed by using the program status word (PSW) key.

In one example, when a block of data (e.g., 4K bytes) has been moved, condition code 0 is set.

When a page translation exception condition exists, the exception is not recognized if the condition code option indicator, e.g., bit 55 in general register 0, is one; instead, condition code 1 or 2 is set. Condition code 1 is set if, for instance, a page translation exception condition exists for the first operand and not for the second operand. Condition code 2 is set if, for instance, a page translation exception condition exists for the second operand, regardless of whether the condition exists for the first operand.

When the KFC value is 4 or 5 and the real or absolute addresses (possibly after dynamic address translation (DAT)) of the first and second operands are the same, it is model dependent if an operand exception is recognized.

When an access exception can be recognized for both operands, it is unpredictable for which operand an exception is recognized. If one of the exceptions is a page translation exception that would cause condition code 1 or 2 to be set, it is unpredictable whether the access exception for the other operand is recognized or condition code 1 or 2 is set.

When the instruction completes by setting condition codes 1 or 2, and a PER zero-address detection condition also exists for either the first or second operand, it is unpredictable whether the zero-address detection condition is recognized.

The references to main storage are not necessarily single access references and are not necessarily performed in a left-to-right direction, as observed by other CPUs and by channel programs.

When the storage key is set on the first operand block (e.g., KFC values of 4 or 5), a quiescing operation is not necessarily performed.

When the KFC value is 4 or 5, serialization and checkpoint synchronization functions are performed, in one embodiment, before the operation begins and again after the operation is completed.

Example Conditions

In the problem state, when the KFC value is 1 or 2, the operation is performed, e.g., only if the access key specified in general register 0 is valid, that is, if the corresponding PSW key mask bit in control register 3 is one. Otherwise, a privileged operation exception is recognized. In the supervisor state, any value for the specified access key is valid.

When the KFC value is 0, the access key in general register 0 is not tested for validity and a privileged operation exception is not recognized. In the problem state, when the move page and set key facility is installed and the KFC value is 4 or 5, a privileged operation exception is recognized.

In the problem state, when the KFC value is 3 and the access key in general register 0 is not permitted by the PSW-key mask, it is unpredictable whether a specification exception or a privileged operation exception is recognized. KFC values of 6 or 7 result in a specification exception, in one embodiment.

In the ESA/390 compatibility mode, an operation exception is recognized when, for instance, the configuration is not also operating in the ESA/extended-configuration (ESA/XC) mode.

Example Resulting Condition Codes:
0 Data moved and, optionally, key is set
1 Condition code option bit one, page table entry for first operand invalid, and page table entry for second operand valid
2 Condition code option bit one and page table entry for second operand invalid
3—

Program Exceptions:
Access (fetch, operand 2; store, operand 1)
Operand
Privileged operation (access key specified, and selected PSW-key-mask bit is zero in the problem state; KFC values of 4 or 5 in the problem state)
Specification
Transaction constraint Programming Notes:
When KFC values of 4 or 5 are used, another CPU might briefly observe the reference and change bits being set to one for the first operand block, before being set to their final value by the key setting operation.

The destination reference intention bit is to be set to one when there is an intention to reference the first operand by means of an instruction other than Move Page. The bit may allow the control program to process a page translation exception more efficiently.

The condition code set by the instruction normally need not be examined if the condition code option bit is zero or if DAT is off.

Further details of one embodiment of processing based on execution of the Move Page instruction, in accordance with an aspect of the present invention, are described with reference to FIG. 4. In one example, an operating system issues the instruction, which is executed using a processor, such as a general processor 102 or 204. For instance, hardware of the processor is used to execute the instruction. The hardware may be within the processor or coupled thereto for purposes of receiving the instruction from the processor, which, e.g., obtains, decodes and sets-up the instruction to execute on the hardware. Other variations are possible.

Figure 4:
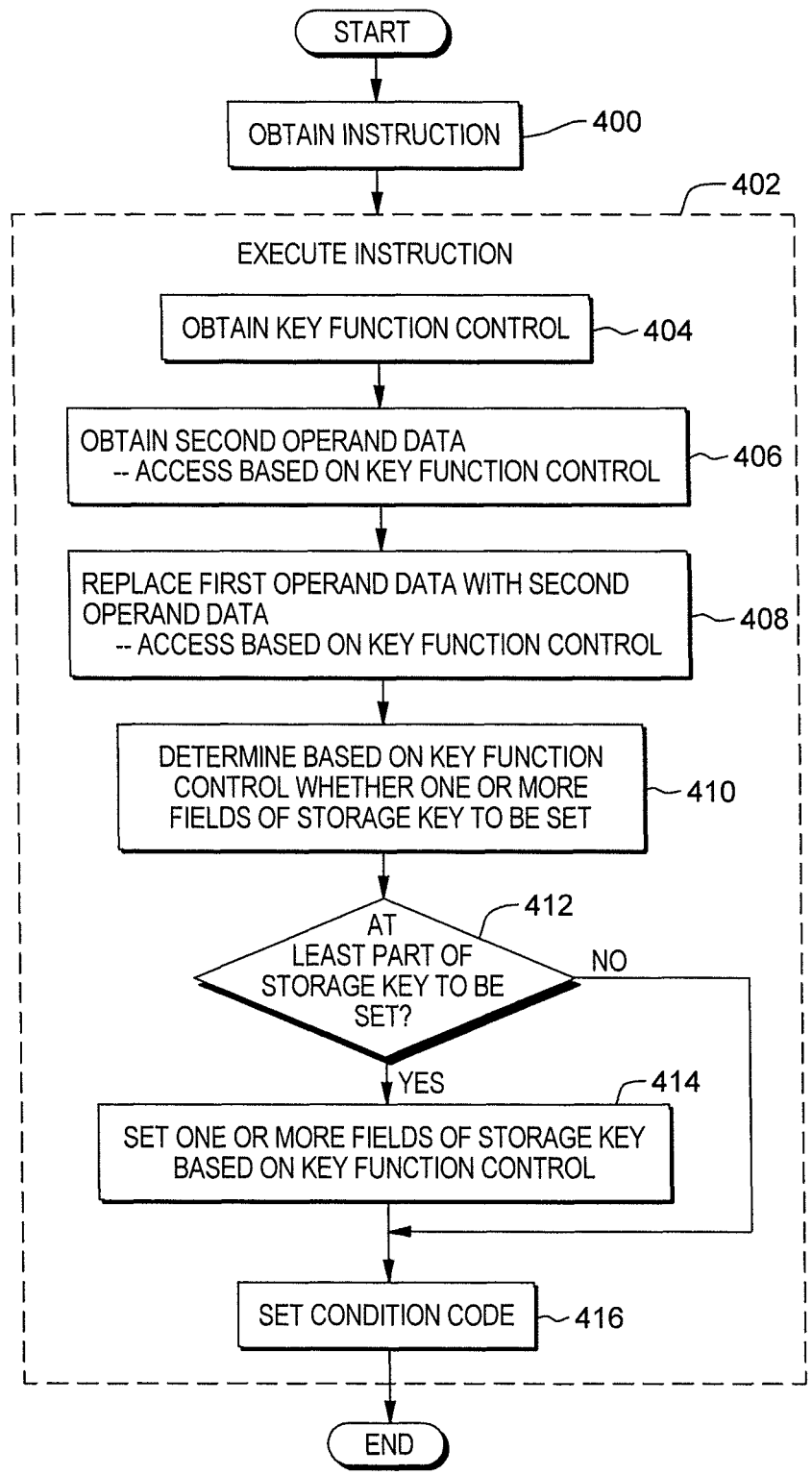
FIG. 4 depicts one example of processing associated with execution of the Move Page instruction, in accordance with an aspect of the present invention.

Referring to FIG. 4, initially, a Move Page instruction is obtained (e.g., fetched, received, provided, etc.) by a processor, such as processor 102 or 204, STEP 400, and the instruction is executed, STEP 402. The executing includes, for instance, obtaining a key function control of the instruction, STEP 404. The key function control is specified by a location (e.g., a register, such as implied general register 0) used by the instruction. The executing further includes obtaining the second operand data, which is, for instance, a block of data (e.g., a page of data) at the second operand location, STEP 406. The second operand location is indicated, for instance, in a general register (e.g., $R_2$) specified by a field of the instruction (e.g., register field 306). Further, access of the second operand data is based on the obtained key function control. For instance, the access may be performed using the storage key specified in general register 0 or a program status word key, depending on the key function control.

The second operand data replaces the first operand data (e.g., block of data, such as a page of data), STEP 408. Again, access to the first operand and the second operand depends on the key function control, as described above.

In addition to moving the data, in accordance with an aspect of the present invention, a storage key associated with the data may be updated. For instance, a determination is made, based on the obtained key function control, whether one or more fields of the storage key are to be set, STEP 410. If at least a part of the storage key is to be set, INQUIRY 412, then one or more fields of the storage key are set based on the key function control, STEP 414. For instance, if the key function control is set to 4, then the storage key of the first operand data (e.g., 4K-byte block of the first operand) is set to the full key supplied in the storage key of general register 0. As another example, if the key function control is set to 5, then the storage key of the first operand data is set, e.g., as follows: the access control and fetch protection values are copied from the storage key of the second operand and the reference and change fields use the value supplied in the storage key of general register 0. Other examples are also possible.

Execution of the instruction completes by setting a condition code, STEP 416.

As described herein, in one aspect, a single instruction (e.g., a single architected machine instruction at the hardware/software interface, e.g., Move Page instruction) is provided to perform move data and set storage key operations using, e.g., a general-purpose processor. This instruction is, for instance, a hardware instruction defined in an Instruction Set Architecture (ISA). As a result, the complexity of the program related to moving data and setting a storage key is reduced. Further, performance of the functions, and thus, the processor, is improved by eliminating an instruction (e.g., a set storage key instruction). Processing is faster, execution times are reduced, and performance is improved.

Although various fields and registers of the Move Page instruction are described, one or more aspects of the present invention may use other, additional or fewer fields or registers, or other sizes of fields and registers, etc. Many variations are possible. For instance, implied registers may be used instead of explicitly specified registers or fields of the instruction and/or explicitly specified registers or fields may be used instead of implied registers or fields. Other variations are also possible.

One or more aspects of the present invention are inextricably tied to computer technology and facilitate processing within a computer, improving performance thereof. The use of a single architected machine instruction to perform moving of data and setting a storage key improves performance within the computing environment. The data may be used in many technical fields, such as in computer processing, medical processing, security, etc. By providing optimizations in moving data and setting a storage key, these technical fields are improved by reducing execution time.

Further details of one embodiment of facilitating processing within a computing environment, as it relates to one or more aspects of the present invention, are described with reference to FIGS. 5A-5B.

Referring to FIG. 5A, in one embodiment, an instruction to perform multiple functions is obtained (500), in which the instruction is a single architected instruction (502). The instruction is executed (504), and the executing includes, for instance, performing a first function of the multiple functions (506) and performing a second function of the multiple functions (508). The first function includes moving a block of data from one location to another location, and the second function includes setting a storage key. The storage key is associated with the block of data at the other location and controls access to the block of data (510). The first function and the second function are performed as part of the single architected instruction (512).

In one example, the performing the first function and the performing the second function are performed concurrently (514).

Further, in one example, the executing the instruction includes obtaining a key function control from a location associated with the instruction, the key function control specifying the second function to be performed (516). The setting the storage key includes, for instance, using the key function control to determine how to set the storage key (518). In one example, the setting of the storage key, based on the key function control, includes setting the storage key using values of corresponding fields of a storage key included in the location associated with the instruction (519). The location associated with the instruction includes, in one example, an implied register used by the instruction (520).

As an example, referring to FIG. 5B, the storage key includes one or more fields used to control access to the block of data (522). The one or more fields include, for instance, an access control field to be used to determine whether access of the block of data is to be performed, a fetch protection field to be used to determine whether key controlled protection applies to fetch-type references, a reference field to be used to determine whether the block of data has been referenced, and a change field to be used to determine whether the block of data has been stored into (524).

Moreover, in one example, the moving the block of data includes replacing data in the other location with the block of data of the one location, the other location and the one location being specified by the instruction (526). In one example, the other location is specified by one register indicated by one register field of the instruction and the one location is specified by another register indicated by another register field of the instruction (528).

As an example, the block of data includes a page of data (530).

Other variations and embodiments are possible.

Figure 6A:
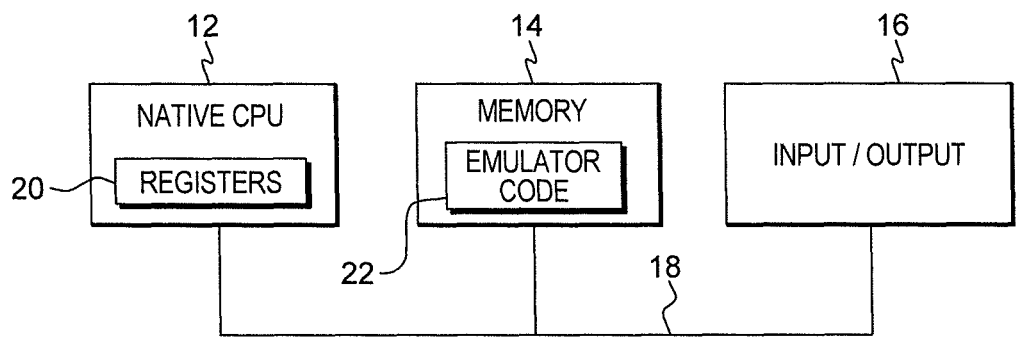
FIG. 6A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 6A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 6B:
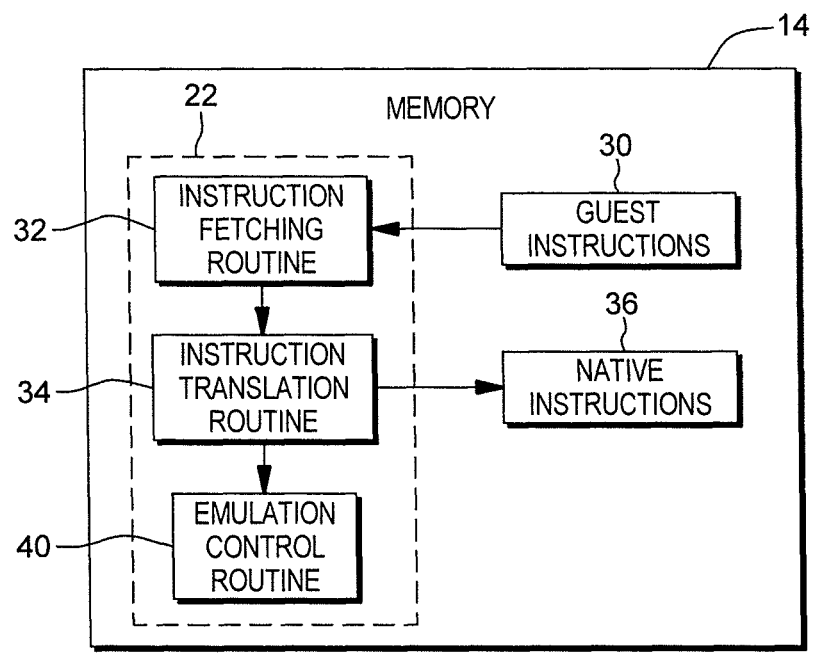
FIG. 6B depicts further details of the memory of FIG. 6A.

Further details relating to emulator code 22 are described with reference to FIG. 6B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to provide move data/set storage key processing, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
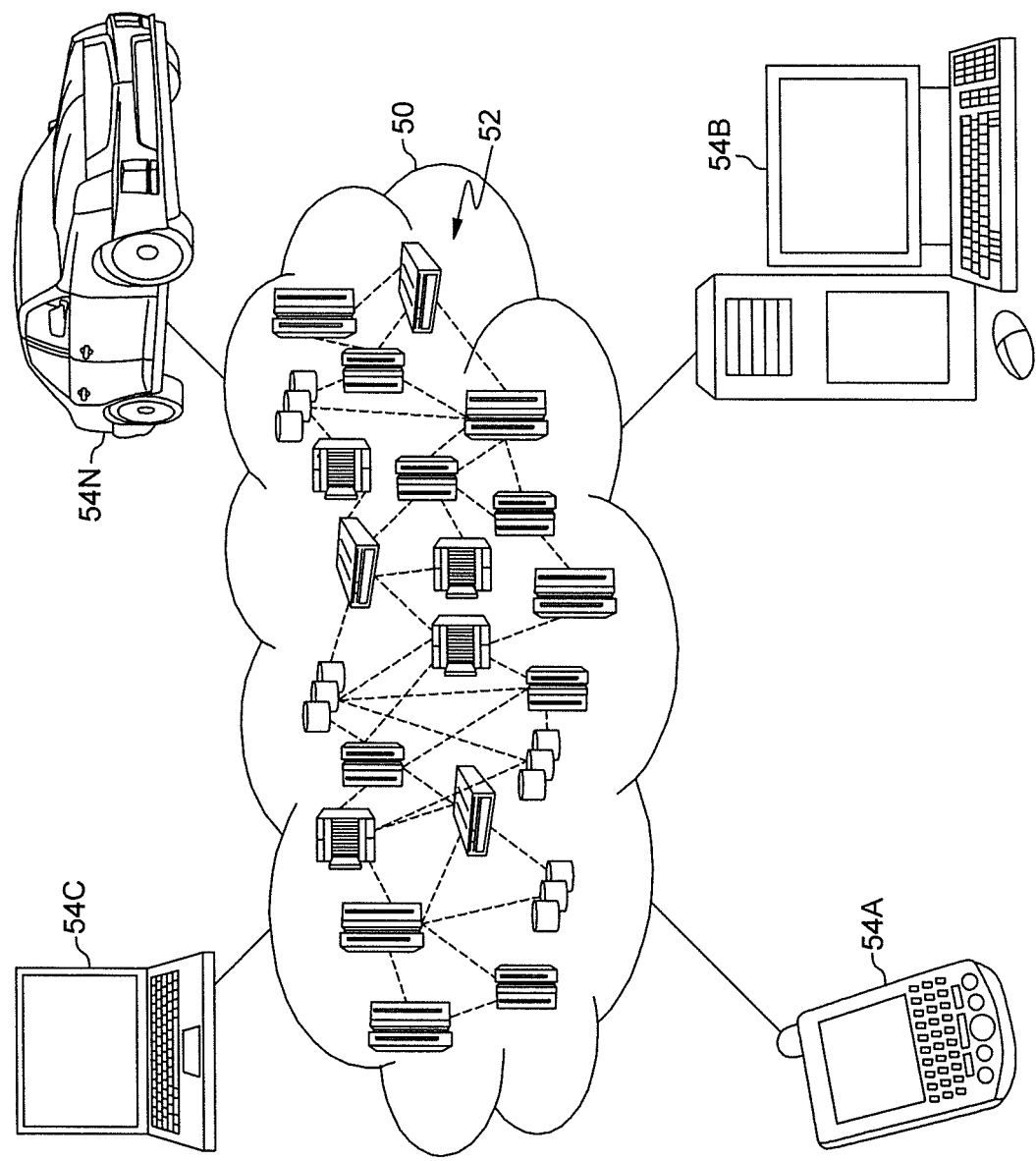
FIG. 7 depicts one embodiment of a cloud computing environment.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
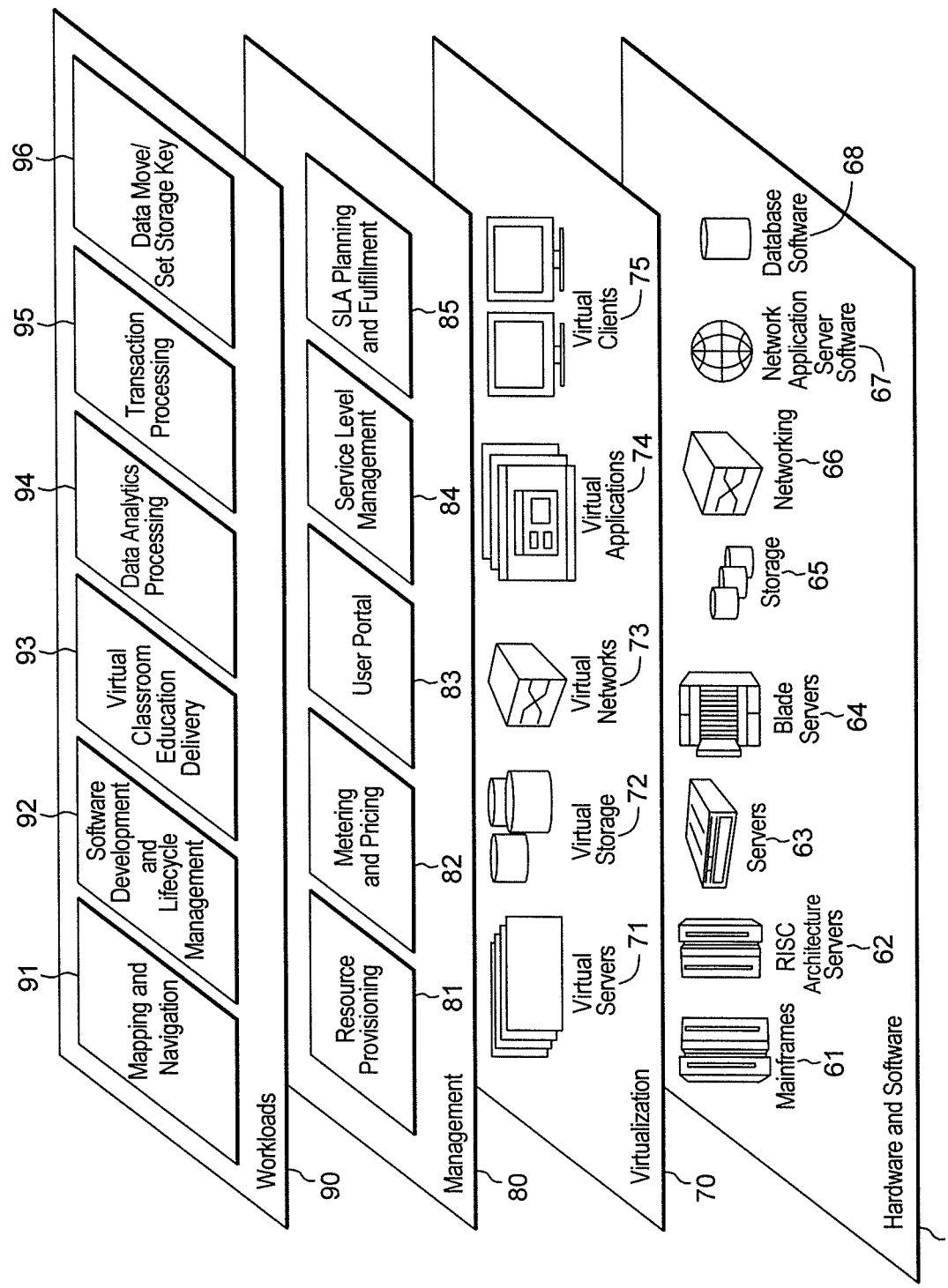
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and move data/set storage key processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different types of controls may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

a computer readable storage medium readable by a processing circuit and storing instructions for performing a method comprising:

obtaining an instruction to perform multiple functions, the instruction being defined in an architecture as a single architected instruction; and executing the instruction, the executing comprising:

performing a first function of the multiple functions, the first function comprising moving a block of data from one location to another location; and performing a second function of the multiple functions, the second function comprising setting a storage key, the storage key being associated with the block of data at the other location and controlling access to the block of data, the first function and the second function being performed as part of the single architected instruction, and wherein as defined in the architecture the single architected instruction includes an operation code specifying one function of the first function and the second function and no separate operation code specifying the other function of the first function and the second function, and wherein a location used by the instruction is used to specify the other function, the location being different from the operation code.

2. The computer program product of claim 1, wherein the performing the first function and the performing the second function are performed concurrently.

3. The computer program product of claim 1, wherein the one function is the first function and the other function is the second function, and wherein the executing the instruction includes obtaining a key function control from the location, the location being associated with the instruction, the key function control specifying the second function to be performed.

4. The computer program product of claim 3, wherein the setting the storage key comprises using the key function control to determine how to set the storage key.

5. The computer program product of claim 4, wherein the setting the storage key, based on the key function control, comprises setting the storage key using values of corresponding fields of a storage key included in the location associated with the instruction.

6. The computer program product of claim 3, wherein the location associated with the instruction comprises an implied register used by the instruction.

7. The computer program product of claim 1, wherein the storage key comprises one or more fields used to control access to the block of data.

8. The computer program product of claim 7, wherein the one or more fields comprise an access control field to be used to determine whether access of the block of data is to be performed, a fetch protection field to be used to determine whether key controlled protection applies to fetch-type references, a reference field to be used to determine whether the block of data has been referenced, and a change field to be used to determine whether the block of data has been stored into.

9. The computer program product of claim 1, wherein the moving the block of data comprises replacing data in the other location with the block of data of the one location, the other location and the one location being specified by the instruction.

10. The computer program product of claim 9, wherein the other location is specified by one register indicated by one register field of the instruction and the one location is specified by another register indicated by another register field of the instruction.

11. A computer system for facilitating processing within a computing environment, the computer system comprising:
   a memory; and
   a processor coupled to the memory, wherein the computer system is configured to perform a method comprising:
      obtaining an instruction to perform multiple functions, the instruction being defined in an architecture as a single architected instruction; and
      executing the instruction, the executing comprising:
         performing a first function of the multiple functions, the first function comprising moving a block of data from one location to another location; and
         performing a second function of the multiple functions, the second function comprising setting a storage key, the storage key being associated with the block of data and controlling access to the block of data, the first function and the second function being performed as part of the single architected instruction, and wherein as defined in the architecture the single architected instruction includes an operation code specifying one function of the first function and the second function and no separate operation code specifying the other function of the first function and the second function and wherein a location used by the instruction is used to specify the other function, the location being different from the operation code.

12. The computer system of claim 11, wherein the one function is the first function and the other function is the second function, and wherein the executing the instruction includes obtaining a key function control from the location, the location being associated with the instruction, the key function control specifying the second function to be performed.

13. The computer system of claim 12, wherein the setting the storage key comprises using the key function control to determine how to set the storage key.

14. The computer system of claim 13, wherein the setting the storage key, based on the key function control, comprises setting the storage key using values of corresponding fields of a storage key included in the location associated with the instruction.

15. The computer system of claim 11, wherein the moving the block of data comprises replacing data in the other location with the block of data of the one location, the other location and the one location being specified by the instruction.

16. A computer-implemented method of facilitating processing within a computing environment, the computer-implemented method comprising:
   obtaining an instruction to perform multiple functions, the instruction being defined in an architecture as a single architected instruction; and
   executing the instruction, the executing comprising:
      performing a first function of the multiple functions, the first function comprising moving a block of data from one location to another location; and
      performing a second function of the multiple functions, the second function comprising setting a storage key, the storage key being associated with the block of data and controlling access to the block of data, the first function and the second function being performed as part of the single architected instruction, and wherein as defined in the architecture the single architected instruction includes an operation code specifying one function of the first function and the second function and no separate operation code specifying the other function of the first function and the second function, and wherein a location used by the instruction is used to specify the other function, the location being different from the operation code.

17. The computer-implemented method of claim 16, wherein the one function is the first function and the other function is the second function, and wherein the executing the instruction includes obtaining a key function control from the location, the location being associated with the instruction, the key function control specifying the second function to be performed.

18. The computer-implemented method of claim 17, wherein the setting the storage key comprises using the key function control to determine how to set the storage key.

19. The computer-implemented method of claim 18, wherein the setting the storage key, based on the key function control, comprises setting the storage key using values of corresponding fields of a storage key included in the location associated with the instruction.

20. The computer-implemented method of claim 16, wherein the moving the block of data comprises replacing data in the other location with the block of data of the one location, the other location and the one location being specified by the instruction.

* * * * *